US011885209B2

(12) United States Patent
Koricanek

(10) Patent No.: US 11,885,209 B2
(45) Date of Patent: *Jan. 30, 2024

(54) MANIFOLD ASSEMBLY FOR DELIVERY OF FRACTURE FLUID

(71) Applicant: Bobby Lee Koricanek, Yorktown, TX (US)

(72) Inventor: Bobby Lee Koricanek, Yorktown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,330

(22) Filed: Nov. 11, 2022

(65) Prior Publication Data

US 2023/0070737 A1    Mar. 9, 2023

Related U.S. Application Data

(63) Continuation of application No. 17/030,807, filed on Sep. 24, 2020, now Pat. No. 11,519,251, which is a continuation of application No. 16/438,065, filed on Jun. 11, 2019, now Pat. No. 10,808,512.

(60) Provisional application No. 62/685,114, filed on Jun. 14, 2018.

(51) Int. Cl.
  *E21B 43/26* (2006.01)
  *F16L 23/20* (2006.01)

(52) U.S. Cl.
  CPC .......... *E21B 43/2607* (2020.05); *E21B 43/26* (2013.01); *F16L 23/20* (2013.01)

(58) Field of Classification Search
  CPC ................................ E21B 43/26; F16L 23/20
  See application file for complete search history.

(56) References Cited

U.S. PATENT DOCUMENTS

| | | | |
|---|---|---|---|
| 4,410,186 | A | 10/1983 | Pierce, Jr. |
| 8,474,521 | B2 | 7/2013 | Kajaria et al. |
| 8,656,990 | B2 | 2/2014 | Kajaria et al. |
| 9,222,609 | B1 | 12/2015 | Lee |
| 9,932,800 | B2 | 4/2018 | Guidry |
| 10,808,512 | B2 | 10/2020 | Koricanek |
| 11,519,251 | B2 * | 12/2022 | Koricanek .......... E21B 43/2607 |

(Continued)

OTHER PUBLICATIONS

"Frac Manifold Solutions," Performance Wellhead & Frac Components, 2012.

(Continued)

*Primary Examiner* — Kevin F Murphy
(74) *Attorney, Agent, or Firm* — Cabello Hall Zinda, PLLC

(57) ABSTRACT

Disclosed is a flanged manifold frack delivery system, or manifold assembly, for distributing fluids to a well wherein the assembly comprises at least one high pressure output studded or flanged connection in the absence of rubber seals. The high-pressure connection consists of cross-blocks and spools connected in series to each other. Described is a combination of high and low-pressure conduit configurations disposed along the length of the chassis; the high-pressure conduit assembly is made up using studded or flanged iron connections terminating at the opposite end to the low-pressure inlet with a studded or flanged iron connection so that a spool can be attached at the height of the well head to route the fluid to the well head. The assembly may be pre-fabricated to the user's needs and assembled on site, or may be mobile and delivered to the desired site for use.

27 Claims, 16 Drawing Sheets

(56) References Cited

U.S. PATENT DOCUMENTS

| | | |
|---|---|---|
| 2009/0114392 A1 | 5/2009 | Tolman et al. |
| 2009/0194273 A1 | 8/2009 | Surjaatmadja et al. |
| 2010/0254214 A1 | 10/2010 | Fisher et al. |
| 2011/0048695 A1 | 3/2011 | Cherewyk et al. |
| 2013/0284455 A1 | 10/2013 | Kajaria et al. |
| 2014/0231554 A1 | 8/2014 | Ungchusri et al. |
| 2014/0290768 A1 | 10/2014 | Randle et al. |
| 2016/0102537 A1 | 4/2016 | Lopez et al. |
| 2016/0376864 A1 | 12/2016 | Roesner et al. |
| 2017/0268306 A1 | 9/2017 | Kajaria et al. |
| 2018/0058171 A1 | 3/2018 | Roesner et al. |
| 2018/0283151 A1 | 10/2018 | Cook et al. |

OTHER PUBLICATIONS

EMC Corporation, "Weco Original Wing Unions—Catalog WU-11/96," 1996.

Forum Energy Technologies, "Manifold Trailers," 2019, Retrieved from the Internet: URL: https://www.f-e-t.com/products/completions/well-stimulation/manifold-trailers [Retrieved on May 8, 2019].

* cited by examiner

MANIFOLD ASSEMBLY FOR DELIVERY OF FRACTURE FLUID

CROSS-REFERENCE TO RELATED APPLICATIONS

This application is a continuation of U.S. Nonprovisional application Ser. No. 17/030,807 filed 24 Sep. 2020, which is a continuation of U.S. Nonprovisional application Ser. No. 16/438,065 filed 11 Jun. 2019—now issued as U.S. Pat. No. 10,808,512 on 20 Oct. 2020, which claims priority to U.S. Provisional Application No. 62/685,114 filed 14 Jun. 2018, each of which are incorporated herein by reference in their entireties.

FIELD OF THE DISCLOSURE

This subject matter of the present disclosure relates to fluid delivery systems, and in particular to a manifold fracture delivery system for delivery of fluids under high-pressure.

BACKGROUND OF THE DISCLOSURE

Hydraulic fracturing, or "fracking," is the process of injecting a fluid into a wellbore at high pressure to fracture rock formations and facilitate release of trapped hydrocarbons within the formation. Fracking operations typically use manifold trailers or trailer-mounted skids that have a piping system attached thereon to deliver the pressurized fluids to the wellhead at surface.

During fracking operations, for example, a blender initially mixes the chemicals, proppant (e.g., sand), and carrier fluid for the fracking operation into a slurry. A low-pressure side of the piping system receives the slurry from the blender at a low pressure and routes the slurry to a manifold skid or trailer. From the skid or trailer, the slurry is distributed to a plurality of pumps, which pressurize the slurry to a high-pressure—e.g., up to about 20,000 psi. The pumps return the pressurized slurry to a high-pressure side of the manifold skid or trailer, which then routes the pressurized slurry to the wellhead.

As an example, US 2013/0284455 is directed to a delivery system for fracture applications. US 2014/0231554 is directed to a manifold trailer with multiple articulating arm assemblies. U.S. Pat. No. 8,474,521 is directed to an adjustable modular skid system for manifolds with a plurality of skid modules having a frame to support oil field fluid components.

Conventional manifold skids or trailers include multiple high-pressure piping systems that have multiple discharge points. Rigging up the conventional manifold skid or trailer can require operators to assemble high-pressure flowline iron known as integral iron, which includes piping components, such as tubular connectors, tubular swivel connectors, valves, and piping joints between the manifold skid or trailer and the pumps. These elements couple with other piping preinstalled in parallel along the length of the manifold skid or trailer. The high-pressure flowline integral iron is stacked horizontally and vertically on the manifold skid or trailer to form multiple manifolds.

High-pressure fluid flowing through the high-pressure flowline integral iron can cause the piping components to expand and hammer, which may cause binding and/or failure of one or more of the integral connections between the piping components. Further, the high-pressure fluid flowing through the high-pressure flowline integral iron may pulsate and hammer, which causes vibrations that may induce cracks or failures and contribute to a safety hazard to personnel in one or more of the integral connections between piping components and/or the piping components themselves in the event of failure. Finally, in the case of a component replacement, rig up time and complexity is increased significantly due to the numerous connections between the various piping components of the high-pressure flowline integral iron.

As an example, FIG. 1A is a perspective view of a typical manifold skid or trailer 10 according to the prior art as used within the industry. The typical manifold trailer 10 has a base 12 having a rack 14 on which multiple conduits 30a-b and 40a-b are supported. Headers 20a-b have multiple low-pressure fluid inlets 22 for connection to a source of fluid (e.g., fracture slurry). The headers 20a-b connect to low-pressure conduits 30a-b that run along the length of the rack 14. Often, and as shown here, two low pressure conduits 30a-b run parallel to one another above two high-pressure conduits 40a-b, which also run along the rack 14. The low-pressure conduits 30a-b have a series of low pressure outlets 32 to connect to inlets of external pumps (not shown). The low-pressure outlets 32 typically have 1502 wing-type connections or similar.

On the high-pressure side, each of the outlets of the external pumps (not shown) connect into the high-pressure conduits 40a-b via an inlet assembly 50, which is shown in closer detail in FIG. 1B. Ends of the high-pressure conduits 40a-b have connections 42, which can be 1502 wing-type connections or similar for connecting to downstream components, such as wellhead connections, conduits on another manifold trailer, etc. The inlet assemblies 50 has piping made up of a series of connections 52a-c (e.g., 1502 wing type connections or similar) with swivels 54 to allow for movement of the inlet assemblies 50. All of the connections for the swivels 54 and for the 1502 wing type connections 42, 52a-c have elastomers and gaskets that are prone to leaking and failure.

FIG. 1B is a close-up perspective view of FIG. 1A, illustrating a high-pressure inlet assembly 50. The high-pressure conduit 40 has branched inlet piping 45 from the conduit 40. The swivel 54 connects to the branched piping 45 via connections 54a, such as 1502 wing type connections or similar, and the swivel 54 has piping with similar connections 54b-c. The high-pressure conduit 40 has end connections 42, such as 1502 wing type connections or similar, for connection to the wellhead, zipper manifold, etc. It is known in the industry that when the assembly described in FIGS. 1A-1B is under high pressure, a water hammer effect occurs that can cause very damaging vibration through the high-pressure conduits 40a-b.

The subject matter of the present disclosure is directed to overcoming, or at least reducing the effects of, one or more of the problems set forth above.

SUMMARY OF THE DISCLOSURE

Disclosed herein is a manifold skid having at least one single, high-pressure studded or flanged iron connection output, studded or flanged iron connections, and open-faced connections, that are made to American Petroleum Institute (API) 6A standards. Both studded or flanged connections may be used with the manifold skid of the present disclosure, and particularly for the connections of the high-pressure conduit.

Disclosed herein is a manifold skid having at least one single, high-pressure output studded or flanged connection.

Iron may be used as the studded or flanged metal connection but other metals are acceptable, e.g., aluminum, cast, stainless steel, or any metal that can withstand pressure ratings up to about 22500 psi.

A manifold assembly is connectable to pumps that pressurize fluid from a low-pressure source for delivery to a high-pressure destination. The assembly comprises: a first chassis, a first conduit, and a second conduit. The first chassis has a length. The first conduit is supported on the first chassis and is disposed along the length. The first conduit has at least one first inlet and first outlets. The at least one first inlet is configured to receive the fluid at low-pressure, and the first outlets are configured to deliver the fluid at low-pressure to the pumps.

The second conduit is supported on the first chassis and is disposed along the length adjacent the first conduit. The second conduit has second inlets and a second outlet. The second conduit has at least two connection blocks and at least two spools connected in line with one another along the length of the chassis. Each of the at least two connection blocks has one of the second inlets and has at least one port side. Each of the second inlets is configured to receive the fluid at high-pressure from one of the pumps. The at least two spools are connected to the port sides of the at least two connection blocks for delivering the fluid at high pressure to the second outlet of the second conduit. The second outlet is configured to deliver the fluid at high-pressure to the destination.

The second conduit can be supported a height above the first conduit. The first conduit can comprise a header in fluid communication with the first conduit. The header can have a plurality of the at least one first inlet. The at least one first outlets can comprise a valve configured to open and close fluid communication therethrough. The first conduit can comprise a plurality of the at least one first outlet disposed at spaced intervals along both sides of the length of the first conduit.

The first conduit can comprise at least one port configured to connect in fluid communication with another conduit. The at least one of the connection blocks can have no elastomeric seal. At least one of the connection blocks can comply with API 6A standards.

The second conduit can comprise a plurality of the at least one connection block and a plurality of the at least one spool. Each of the connection blocks can have one of the second inlets, and each of the connection blocks can have one of the port sides connected to one of the spools.

The at least one connection block can comprise two of the at least one second inlet on first opposing sides thereof. The two second inlets can communicate with one another inside the at least one connection block.

The at least one connection block can comprise two of the at least one port side on second opposing sides thereof. The two port sides can communicate with one another and with the two second inlets inside the at least one connection block.

The second inlet can comprise a bonnet and a ring gasket. The bonnet can be connected with a plurality of studs and bolts to the port side of the connection block. The ring gasket can seal the bonnet to the port side. The bonnet can have a female member of a hammer union for coupling with a male member of the hammer union from one of the pumps.

The at least one spool can comprise a flanged end connected with a plurality of studs and bolts to the at least one port side of the at least one connection block.

The flanged end can define a circumferential groove in a face thereof. The at least one connection block can define a corresponding circumferential groove in a face thereof circumscribing the at least one port side, and a gasket can be sandwiched between the circumferential grooves.

The assembly can further comprise a third conduit supported on the first chassis and disposed along the length adjacent the first conduit. The third conduit can have at least one third inlet and at least one third outlet. The at least third first inlet can be configured to receive the fluid at low-pressure, and the at least one third outlet can be configured to deliver the fluid at low-pressure to at least one of the pumps.

The assembly can further comprise sing a third conduit supported on the first chassis and disposed along the length adjacent the second conduit. The third conduit can have at least one third inlet and at least one third outlet, and the third conduit can have at least one connection block and at least one spool. The at least one connection block can have the at least one third inlet and can have at least one port side. The at least one third inlet can be configured to receive the fluid at high-pressure from at least one other of the pumps. The at least one spool can be connected to the at least one port side of the at least one connection block for delivering the fluid at high pressure to the at least one third outlet of the third conduit. The at least one third outlet can be configured to deliver the fluid at high-pressure to the destination.

The at least second and third outlets of the first and second conduits can combine to a common outlet. The second and third conduits can run parallel to one another along the length of the first chassis.

The assembly can further comprise a second chassis supporting additional ones of the first and second conduits. The additional one of the first conduit can be disposed in line with, and connected in fluid communication with, the first conduit of the first chassis. The additional one of the second conduit can be disposed in line with, and connected in fluid communication with, the second conduit of the first chassis.

A manifold assembly is connectable to fracturing pumps that pressurize treatment fluid from a low-pressure source for delivery to a high-pressure destination associated with a wellbore. The assembly comprises a chassis and at least one conduit. The chassis has a length. The at least one conduit is supported on the chassis and is disposed along the length.

The at least one conduit has inlets and at least one outlet, and the at least one conduit has at least two connection blocks and at least two spools. Each of the at least two connection blocks has one of the inlets, and each of the inlets is configured to receive the fluid at high-pressure from one of the fracturing pumps. Ends of one of the spools interconnects the at least two of the connection blocks in fluid communication. The at least one outlet of the at least one conduit comprises the other of the spools configured to deliver the fluid at high pressure to the destination associated with the wellbore.

A method of pressurizing fluid from a low-pressure source with pumps for delivery to a high-pressure destination comprises: receiving the fluid at low pressure from the low-pressure source at at least one first inlet of a first conduit; conveying the fluid along a first length of the first conduit to a plurality of first outlets spaced along the first length of the first conduit and configured to deliver the fluid at low-pressure to a corresponding one of the pumps; receiving the fluid at high pressure from the pumps at second inlets in connection blocks interconnected by spools of a second conduit; and conveying the fluid along a second length of the second conduit along the connection blocks interconnected by the spool to a second outlet configured to deliver the fluid at high-pressure to the destination.

The method can further comprise initially blending components of the fluid from the low-pressure source. The method can further comprise pumping the fluid from each of the first outlets with corresponding ones of the pumps; and discharging the pumped fluid at high pressure to one of the second inlets.

The foregoing summary is not intended to summarize each potential embodiment or every aspect of the present disclosure.

BRIEF DESCRIPTION OF THE FIGURES

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The subject matter of the present disclosure focuses on a high-pressure side of a manifold assembly used for fracking, treatment, stimulation, or other high-pressure fluid operation. High-pressure in terms of such operations can be defined as being up to 22500 psi, with a range of about 2000 to 22500 psi. The particular pressures employed for a fracking operation depend on the formation being fractured. Should the assembly be used for non-fracturing purposes, the particular pressures employed depend on what materials are being processed and for what purpose.

Disclosed herein is a manifold assembly designed to deliver fluids for a wellhead. The assembly includes a chassis; at least one cross-block connected to a spool forming a single low-pressure conduit disposed along the length of the chassis; at least one high pressure conduit comprising at least one cross-block connected to a spool, disposed along the length of the chassis, the high-pressure outlet terminating at a high pressure studded connection to distribute fluids from the high-pressure outlet to a wellhead. The high-pressure conduit comprises at least two blocks and spools coupled together along the length of the chassis.

The cross-blocks and spools are coupled together with studded or flanged iron connections and open-faced connections that are manufactured to API 6A standards. Each of the cross-blocks and spool connections are coupled to a respective mounting structure, and may be incorporated into the chassis of the manifold assembly.

The manifold assembly 100 can be secured to a variety of surfaces provided the surface can handle vibrations and can secure the assembly 100 in place. For example, the manifold assembly 100 can be secured onto a skid (which is portable and mobile or fixed and stationary), can be secured onto a pad (cement for example), can mounted on the axle of a trailer, mounted on a flatbed wheel truck, or the like. The assembly 100 may be a free-standing skid, or mounted to a trailer, or configured into a trailer.

In general, the manifold assembly 100 may be used for well fracturing purposes or other low or high-pressure applications. For example, the disclosed assembly 100 can be incorporated into a fracturing manifold skid, although the manifold assembly 100 can be used for applications other than fracking. The manifold assembly disclosed may also be configured so that the high-pressure outlet studded or flanged iron connection height from ground level is equal to the inlet of a connecting downstream assembly. Alternatively, the configuration may include the high-pressure outlet studded or flanged iron connection height from ground level being able to be adjusted. Multiple assemblies 100 may be connected depending upon needs of the user. It is feasible to have from 2 to about 4 or more assemblies 100 connected (in series).

Figure 2A:
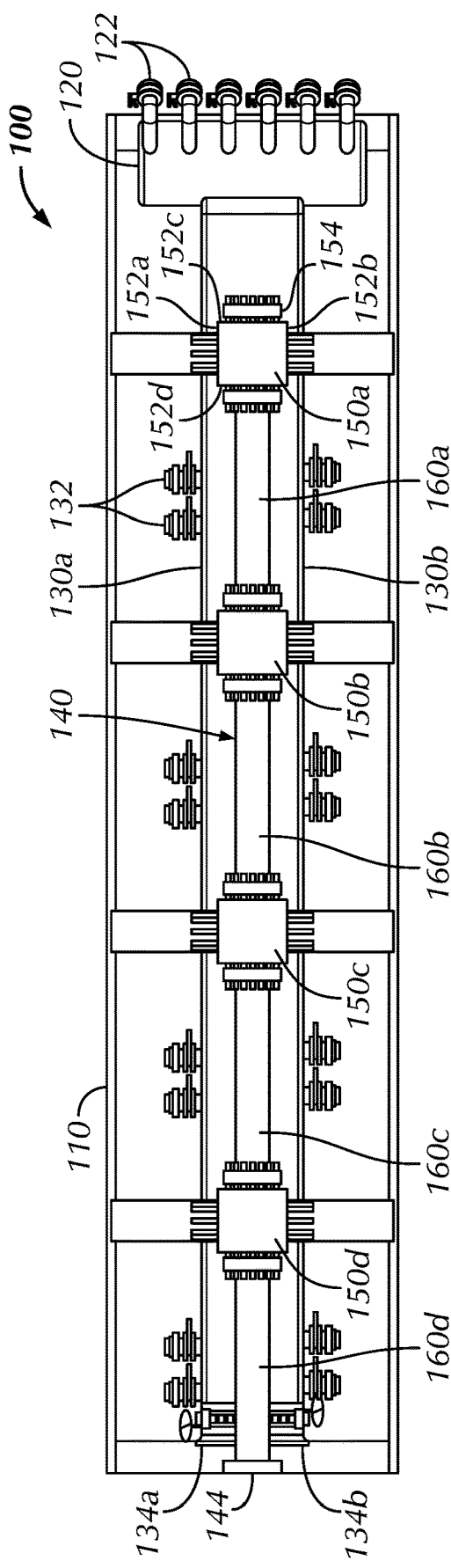
FIG. 2A is a top plan view of a manifold assembly according to an exemplary embodiment of the present disclosure.

Given the overview above, discussion turn to an arrangement of a manifold assembly. FIG. 2A illustrates a top plan view of a manifold assembly 100 according to the present disclosure. The manifold assembly 100 has a chassis 110, which can be a free-standing skid, can be part of a trailer mounted skid, can be fixedly incorporated into a trailer, or can be arranged in any combination thereof.

The manifold assembly 100 is connectable to pumps (not shown) that pressurize fluid from a low-pressure source (not shown) for delivery to a high-pressure destination (not shown). The source can be blender in which chemicals, carrier fluid, and proppant or sand are mixed. The high-pressure destination can include one or more fracturing trees, wellheads, other manifold assembly, or the like.

The assembly 100 includes a chassis 110, at least one first conduit 130*a-b* supported on the chassis 110, and at least one second conduit 140. The conduits 130*a-b*, 140 are supported on the chassis 110.

The first conduit 130*a-b* is a low-pressure conduit. The first conduit 130*a-b* has at least one first inlet (e.g., inlet connection 122 on a header 120) and has first outlets 132. The at least one first inlet 122 is configured to receive the fluid at low-pressure from the low-pressure source, such as the blender (not shown). As noted herein, the fluid can be a fracturing fluid, a treatment fluid, a slurry, or the like. The first outlets 132 are configured to deliver the fluid at low-pressure to the pumps (not shown).

The second conduit 140 is a high-pressure conduit. As shown, the high-pressure conduit 140 is disposed above the low-pressure conduits 130a-b. It is understood that these conduits 130a-b, 140 may be in other arrangements. For example, the low-pressure conduits 130a-b can be above the high-pressure conduit 140. Moreover, the conduits 130a-b, 140 can be arranged as side by side, or near each other where they are not directly above or directly below each other.

The high-pressure conduit 140 has at least two connection blocks or cross-blocks 150 and at least two spools 160 connected in line with one another along the length of the chassis 110. Each of the connection blocks 150 has at least one inlet configured to receive the fluid at high-pressure from at least one of the pumps. Each of the spools 160 is connected to a port side of a connection block 150 for delivering the fluid at high pressure to an outlet 144 of the high-pressure conduit 140. This outlet 144 of the conduit 140 is configured to deliver the fluid at high-pressure to the destination, such as another manifold assembly, a wellhead, or the like.

As shown, the at least one low-pressure conduit 130a-b can include two conduits 130a-b that run parallel to one another along the length of the manifold assembly 100. Incorporated into the low-pressure conduit 130a-b is a low-pressure inlet header 120 having multiple inlet connections 122 (e.g., wing type 1502 connections) to connect to one or more fluid source (not shown) via flow lines (not shown).

The one or more fluid sources (not shown) can include one or more blenders, fluid storage tanks, natural water features, or any combination thereof, although other types of fluid sources can be used. The low-pressure conduit 130a-b has multiple low-pressure outlet connections 132 (e.g., wing type 1502 connections) having valves. The valved connections 132 are disposed at spaced intervals along both sides of the length of the chassis 110. Each of these valved outlet connections 132 allows for the suction side of a pump (not shown) to be coupled to the low-pressure conduit 130a-b.

At least some of the valved outlet connections 132 may be coupled to one or more pumps that pressurize the fluid from the low-pressure conduit 130a-b. As discussed in more detail below, pressurized fluid can then flow to the high-pressure conduit 140 of the manifold assembly 100.

As shown, the low-pressure conduits 130a-b has two outlets 134a-b with valves at the opposite end of the chassis 110 from the low-pressure inlet manifold 120. These valved outlets 134a-b allow for a second manifold assembly (not shown) or other component to be connected in line with the present manifold assembly 100. For example, the valved outlets 134a-b can be connected by lines to the inlets 122 of a header 120 on another assembly. Alternatively, these valved outlets 134a-b can be connected directly to the low-pressure conduits 130a-b on another assembly, or the valved outlets 134a-b may be closed.

As shown in FIG. 2A, the at least one high-pressure conduit 140 can be a single high-pressure conduit 140 including a series of cross-blocks 150a-d and spools 160a-d interconnected in series to each other. Each of the cross-blocks 150a-d can be four-way as shown. Although the cross-blocks 150a-d are described here with a four-way configuration, it is understood that any block having at least two ways and up to six or more ways for connections may be used.

At one end, the conduit 140 includes a first four-way cross-block 150a that has one port side 152c closed with a studded blind flange 154. The first four-way cross-block 150a includes a first spool 160a that is connected from an opposing port side 152d to a second four-way cross-block 150b, which in turn is connected to another spool 160b, and so forth. The four-way cross-blocks 150a-d are attached to the chassis 110 via support members 115 under each cross-block 150a-d. The cross-blocks 150a-d can be removed for serviceability and reconfiguration or as desired by the user, typically per customer requirements.

The last spool 160d on the end of the assembly 100 has a single high-pressure output studded or flanged iron connection for the outlet 144 of the manifold assembly 100. This outlet 144 can be connected to one or more systems depending on the implementation. In general, the studded or flanged iron connection 144 can be connected to: one or more systems at the wellhead (not shown), one or more systems in the wellbore of which the wellhead is the surface termination, one or more systems downstream of the wellhead, or one or more other systems associated with the wellhead.

Figure 2B:
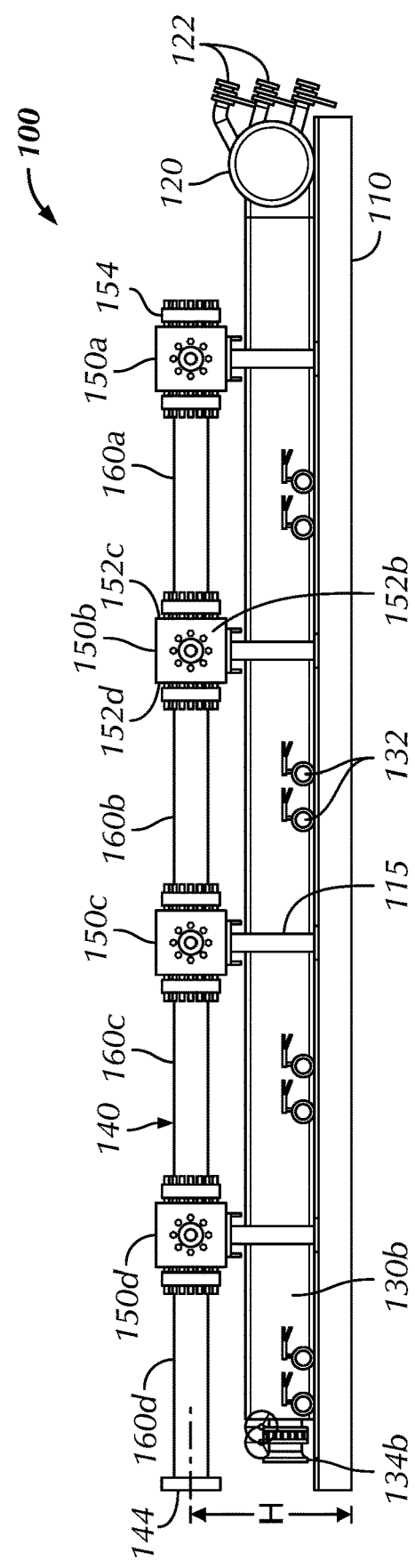
FIG. 2B is a side view of the disclosed manifold assembly.

FIG. 2B is a side view of the manifold assembly 100. The manifold assembly 100 is made up of the chassis 110. The low-pressure conduits (only 130b shown) runs along the length of the manifold assembly 100. Incorporated into the low-pressure conduit 130b is the low-pressure inlet manifold 120 with the multiple inlet connections 122. The low-pressure conduit 130b has the multiple low-pressure outlet connections 132 with valves. These valved connections 132 allows for the suction side of a pump (not shown) to be coupled to the low-pressure conduit 130b.

As noted previously, at least a portion of the low-pressure valved outlet connections 132 may be coupled to a pump that pressurizes the fluid from the low-pressure conduit 130b, which pressurizes fluid and then flows the pressurized fluid to the high-pressure conduit 140 of the manifold assembly 100. The low-pressure conduit 130b has the valved connection 134b at the opposite end of the low-pressure inlet manifold 120 that allows for a second manifold assembly (not shown) or other component to be connected in line with manifold assembly 100.

As again shown in FIG. 2B, the high-pressure conduit 140 is made up of the four-way cross-blocks 150a-d interconnected by the spools 160a-c. The first cross-block 150a has one port side 152c closed with the studded blind flange 154. The last four-way cross block 150d has a final spool 160d, with a flanged connection for the outlet 144. As used herein, "made up," "connected" and "attached" are considered equivalent and interchangeable words.

The four-way cross-blocks 150a-d are attached to the chassis 110 via the support members 115, and the cross-blocks 150a-d can be removed for serviceability and reconfiguration as desired by the user, or for customer requirements.

The high pressure studded or flanged iron connection for the outlet 144 is generally set at a height H of about 42-in from the ground level unlike other manifold trailers. This height H can provide for ease of connection of the flanged connection 144 to another manifold assembly (100), a wellhead (not shown), or the like. If required or desired, the height H can be adjusted for a given implementation using a larger chassis, a pad, different length supports members 115, or the like.

Figure 2C:
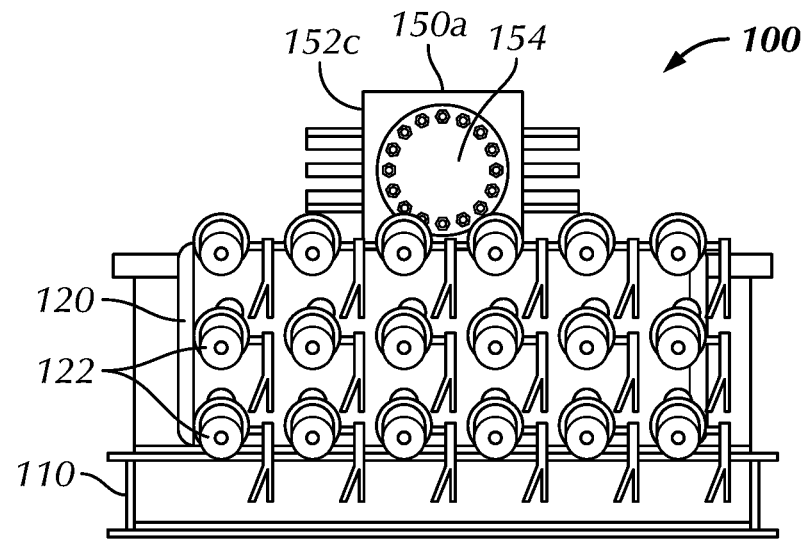
FIG. 2C is a rear view of the disclosed manifold assembly.

FIG. 2C is a rear view of the manifold assembly 100 showing the low-pressure header 120. As shown, the low-pressure header 120 can have several rows of a number of valved connections 122. Here, there are three rows having six connections 122 each, but more or fewer rows and connections 122 can be provided.

During operation, only one row or portion of one row of the valved connections 122 may be connected to a source of fluid, while the remaining valved connections 122 may be shut off. As noted previously, the low-pressure header 120 is connected to the low-pressure conduit (130a-b shown in FIGS. 2A-2B) to allow fluid to flow through to the low-pressure valved outlet connections (132 shown in FIGS. 2A-2B).

For the high-pressure conduit 140, a studded blind flange 154 on the end cross-block 150 can be removed to connect to another high-pressure conduit from another manifold assembly (not shown). This allows for the ability to connect more pumps for a higher flow rate.

Figure 2D:
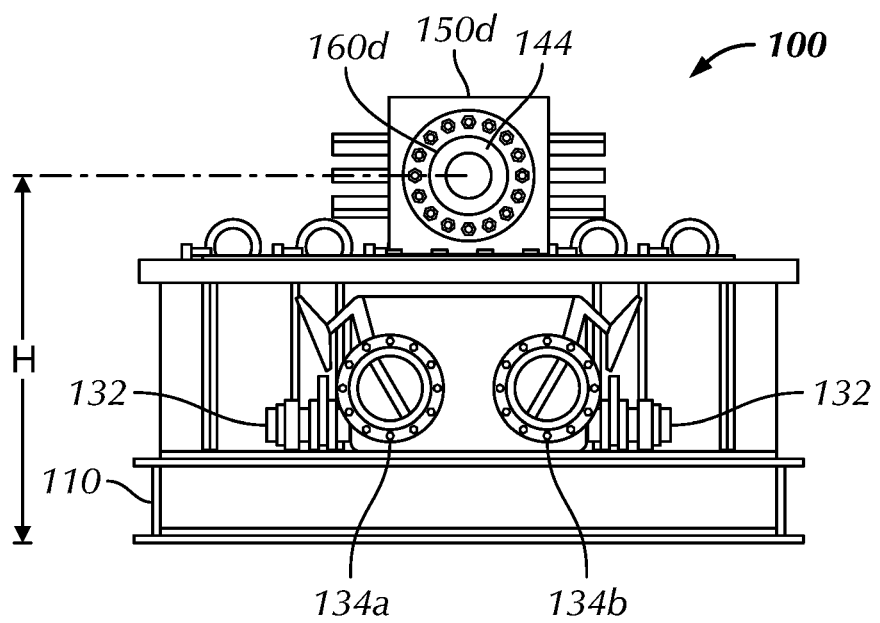
FIG. 2D is a front view of the disclosed manifold assembly.

FIG. 2D is a front view of the manifold assembly 100 showing the low-pressure conduits 130a-b that run along the length of the manifold assembly 100. At the front end of the low-pressure conduits 130a-b, the two low pressure connections 134a-b with valves are shown which can be closed off or can connect to low pressure conduits (not shown) another manifold assembly or to other components.

On the last spool 160d extending from the last cross-block 150d, the single high-pressure output studded or flanged iron connection 144 can be connected to: (a) one or more systems at the wellhead (not shown), (b) more systems in the wellbore of which the wellhead is the surface termination, (c) one or more systems downstream of the wellhead, or (d) one or more other systems associated with the wellhead. For exemplary purposes, the high pressure studded or flanged iron connection 144 may be set at the height H of about 42-in from the ground level for ease of connection to another manifold assembly or to a wellhead. If required or desired, the height H can be adjusted, as already indicated.

Figure 3:
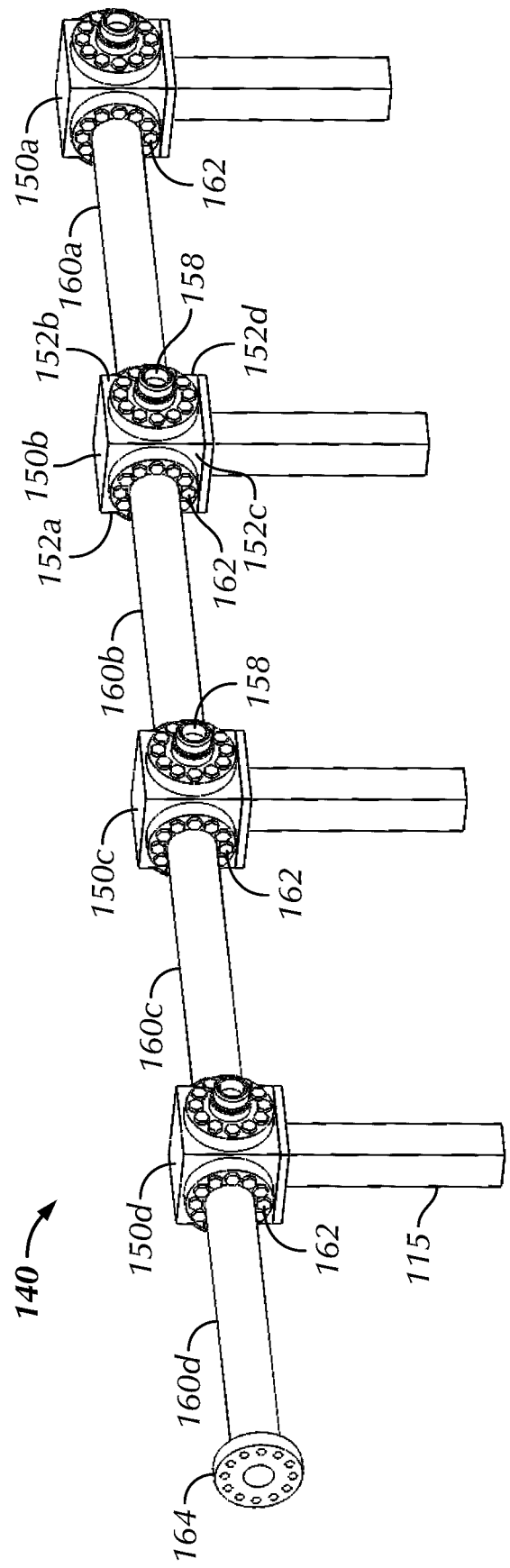
FIG. 3 is a perspective view of an embodiment of a high-pressure conduit flanged manifold fracture delivery system that excludes a low-pressure conduit.

For illustrative purposes, FIG. 3 is a perspective view of the high-pressure conduit 140, shown in isolation from other components of the manifold assembly. The pressurized fluid enters the cross-blocks 150a-d via inlet connections 158 on the opposing port sides 152a-b. The inlet connections 158 can include bonnets attached to the cross-block 150a-d with studs, nuts, and a non-elastomeric sealing gasket, as disclosed herein. The bonnet of the inlet 158 can include the female connector 159 of a 1502 hammer wing union connection for connecting with a male connector (not shown) of the connection.

Inside the cross-blocks 150a-d, flow from the inlet connections 158 on the opposing port sides 152a-b cross over to high-pressure, studded or flanged iron connections to the spools 160a-d connected to the other opposing port sides 154c-d, which are either blocked or connect to one of the spools 160a-d.

As noted above, the high-pressure conduit 140 includes the cross-blocks 150a-d interconnected by the spools 160a-c. The cross-blocks 150a-d can be attached to the spools 160a-d via flanged iron studded connections 162 that are manufactured to API 6A standards. The last spool 160d has a flanged connection 164 for connecting to other components, as noted herein.

Figure 1A:
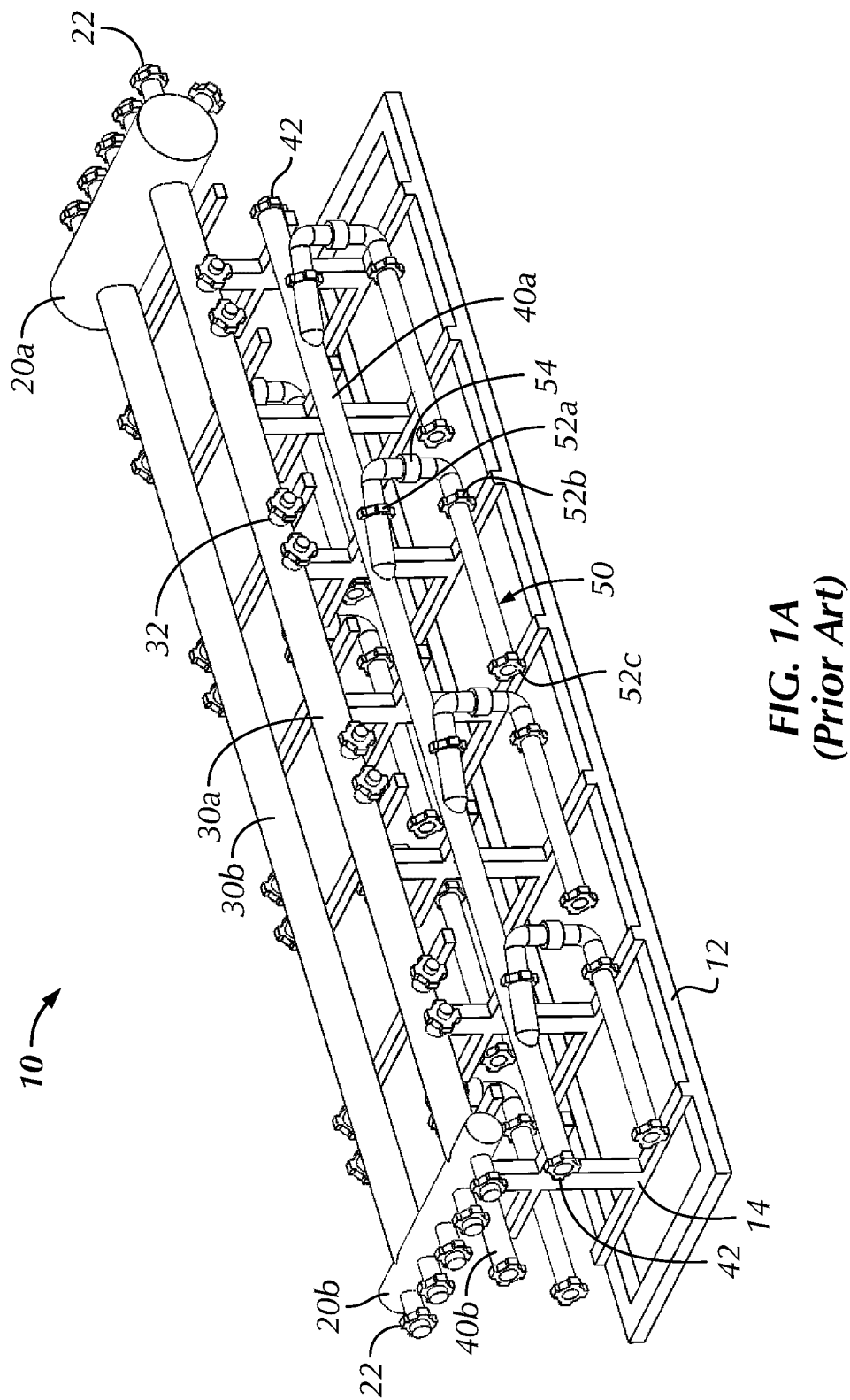
FIG. 1A is a perspective view of a typical manifold trailer according to the prior art as used within the industry.
Figure 1B:
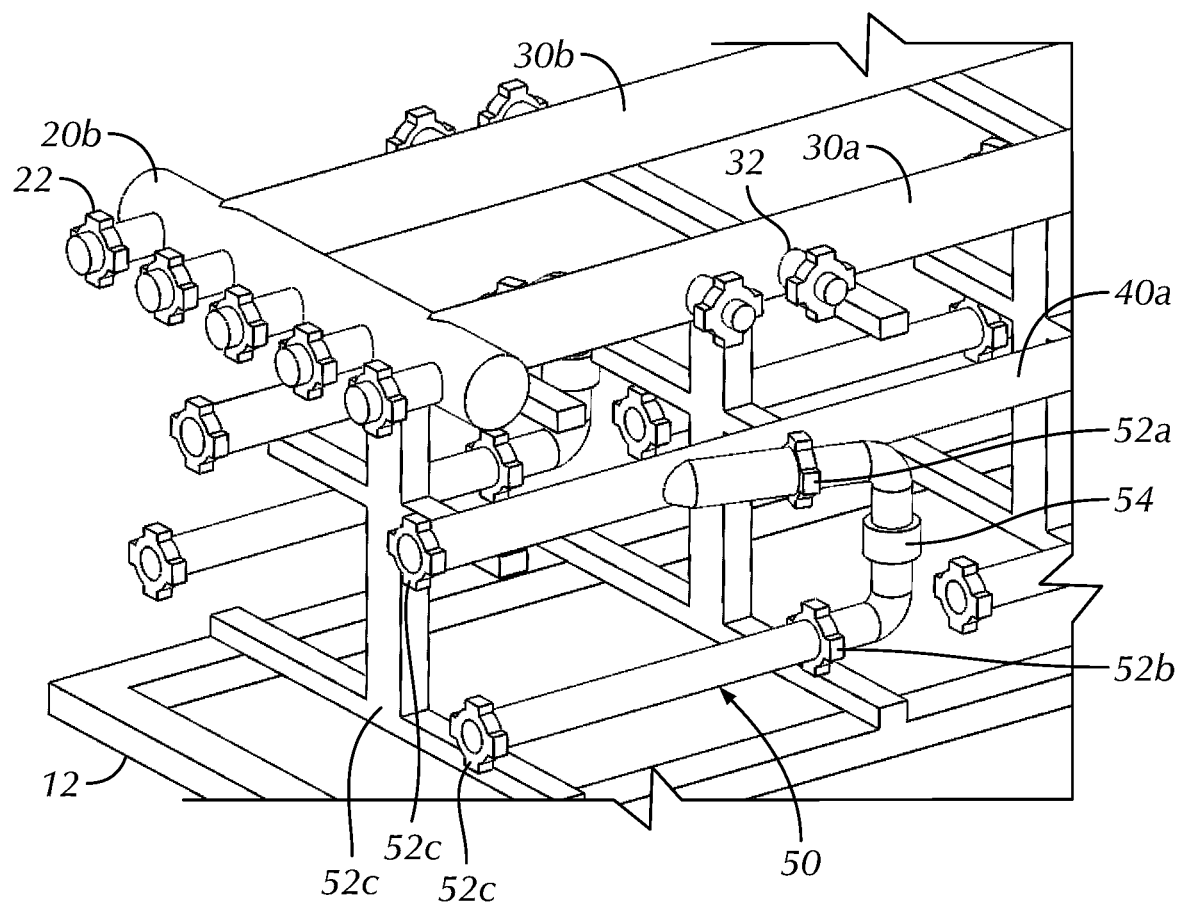
FIG. 1B is a perspective close view of the trailer in FIG. 1A.

Unlike the connections in FIGS. 1A-1B, the high-pressure conduit 140 in FIG. 3 has no elastomers or gaskets. Instead, as described in more detail below, the conduit 140 utilizes alloy steel ring gaskets and metal/metal sealing to provide more reliable and robust sealing. This results in a far superior and robust high-pressure conduit.

It is known in the industry that when an assembly such as described in FIGS. 1A-1B is under high pressure, a hammer effect can occur that can cause very damaging vibration through the high-pressure conduits. The assembly of the present disclosure, however, can reduce issues with vibration by using the combination of cross-blocks 150a-d and the spools 160a-d secured to a skid, as disclosed herein.

As described previously, the manifold assembly 100 can include a chassis 110, at least one low pressure conduit 130a-b disposed along a length of the chassis, and at least one high pressure conduit 140 above the low-pressure conduit 130a-d disposed along the length of the chassis 110. In an alternate arrangement, however, the disclosed assembly 100 can have a chassis 110 and at least one high-pressure conduit 140 (e.g., an embodiment excluding the low-pressure conduit(s) 130a-b). As before, the high-pressure conduit 140 is made up using cross-blocks 150a-d and spools 160a-d with studded or flanged iron connections terminating with a studded or flanged iron connection 144 so the assembly 100 be attached at the height of the wellhead to route the fluid to the well. Low pressure connections may be provided to the pumps on another assembly 100.

Figure 4A:
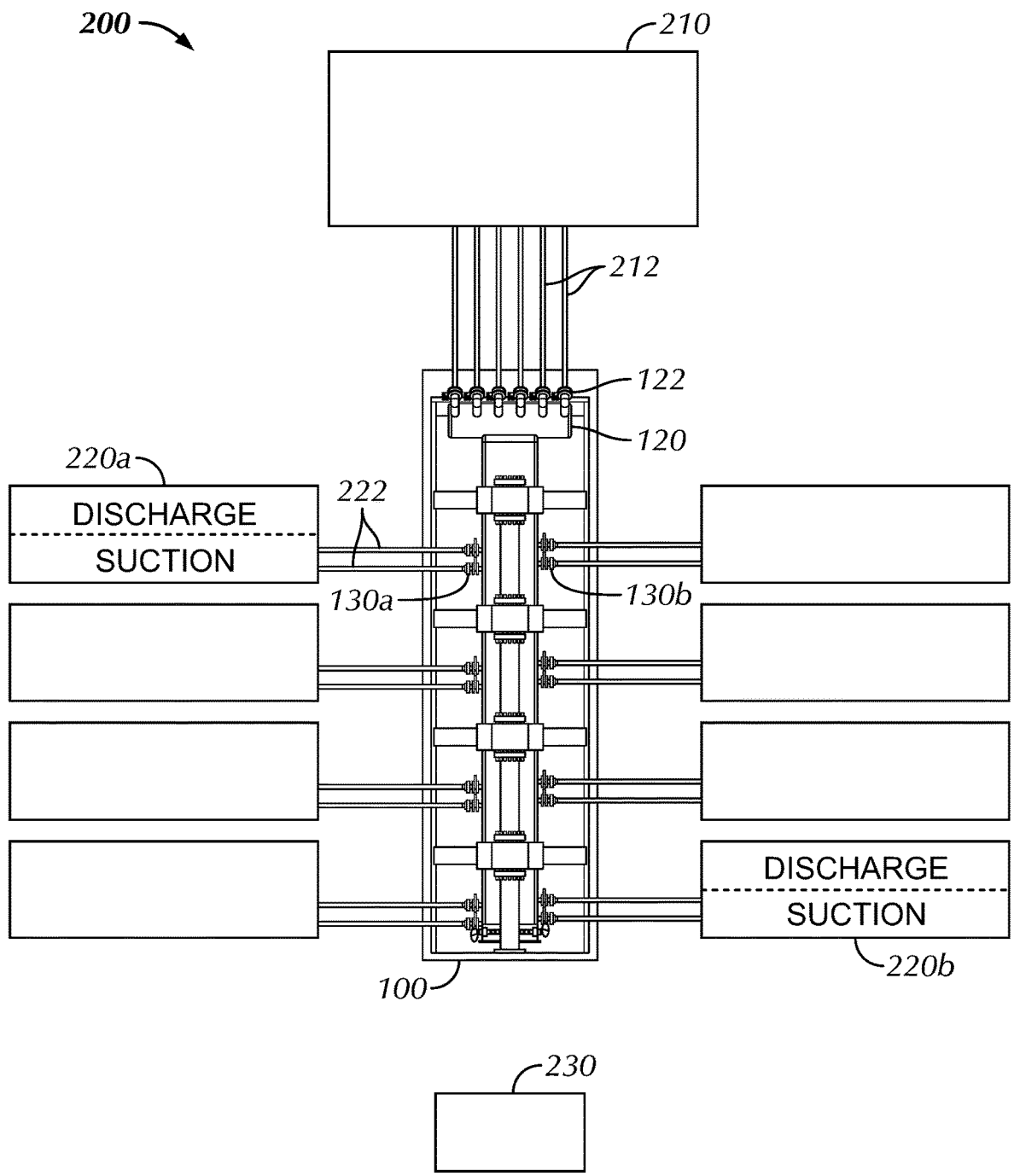
FIGS. 4A-4B are diagrammatic views of intake and outlet arrangements of a flow assembly for use with the disclosed manifold assembly.
Figure 4B:
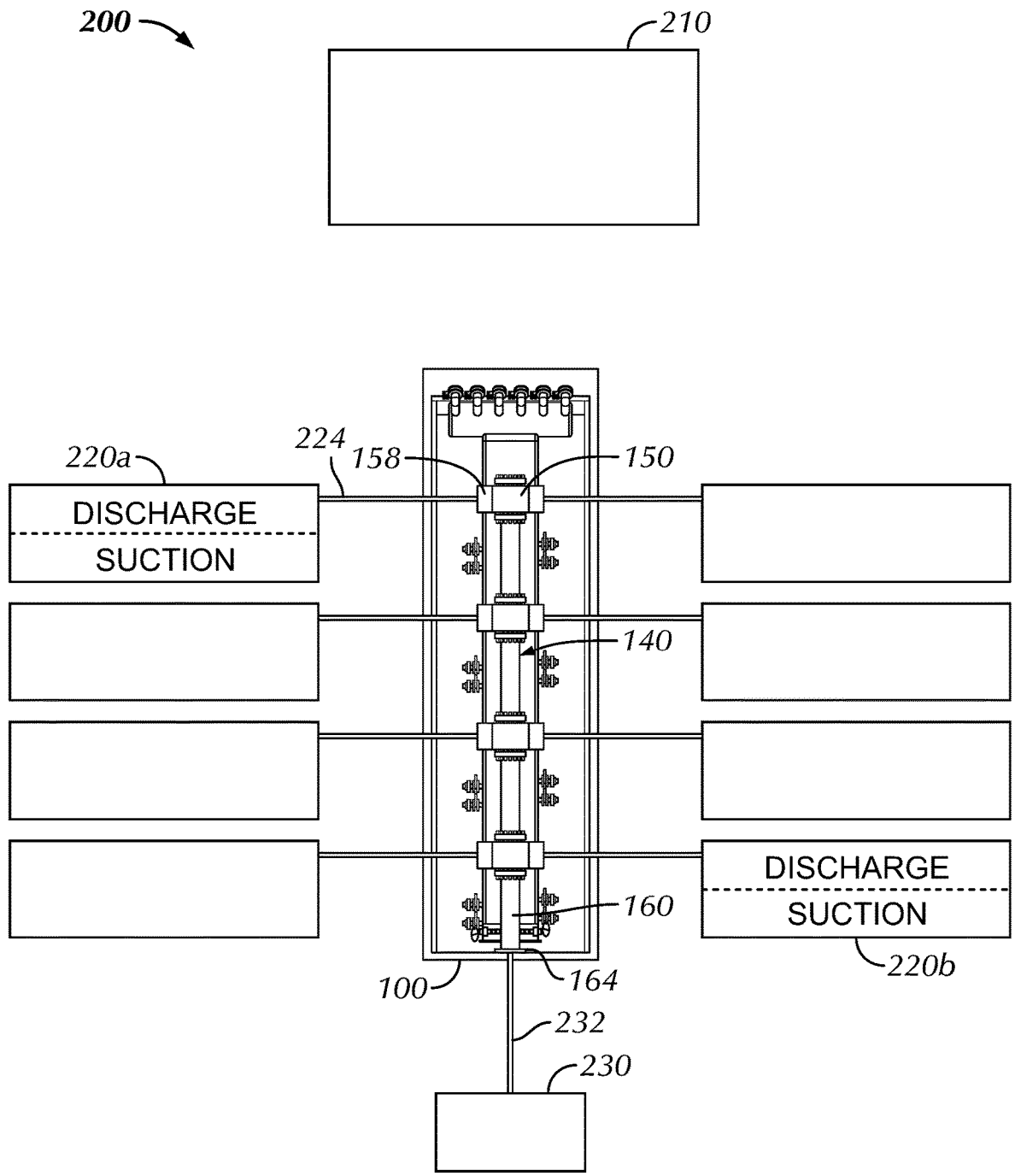

FIGS. 4A-4B are diagrammatic views of both low-pressure and high-pressure intake and outlet arrangements of a flow assembly 200 for use with the disclosed manifold 100. The flow assembly includes a number of pumps 200a-b, a low-pressure source 210, and a high-pressure destination 230. For the low-pressure arrangement of FIG. 4A, the inlets 122 of the low-pressure manifold 120 are connected to multiple inlet hoses or hard piping 212 to connect the manifold assembly 100 to the low-pressure source 210, which can include a blender 210 and can be part of one or more fluid sources, one or more fluid storage tanks, natural water features, or any combination thereof. The blender flow lines 222 are connected to the inlet manifold 120 to deliver the fluid through the low-pressure conduits 130a-b that run the length of the assembly 110 to the low-pressure valve connections 132.

The pumps 200a-b can be arranged along both sides of the assembly 100, and the suction sides of the pumps 200a-b connect with hard piping or hoses 222 to the valved connections 132 on the low-pressure conduits 130a-b. The suction side of each pump 200a-b can connect with one or two hard piping or hoses 222 to the provided pair of the valved connections 132 at each spaced location.

To accommodate multiple pumps 200a-b, the valved connections 132 are spaced at intervals along the length of the chassis 110 and have a spacing generally matching the spacing of high-pressure inlets of the high-pressure conduit 140, as discussed below. Here, eight pumps 200a-b are connected to the manifold assembly 100, although more or fewer pumps 200a-b can be used. For example, one or more pumps 200a-b and any combination thereof can be employed depending on the desired use and site parameters.

For the high-pressure arrangement of FIG. 4B, discharge pressure sides of the pumps 200a-b each have a high-pressure outlet pump swing 224 that connects to an inlet connection 158 of a cross-block 150a-d on the high-pressure conduit 140.

The cross-blocks 150a-d and the pump swings 224 can be connected to each other using connections 158, such as a 1502 hammer union connection incorporated into a studded adapter flange. To accommodate the multiple pumps 200a-b, the cross-blocks 150a-d with their connections 158 are spaced at intervals along the length of the chassis 110 and have a spacing generally matching the spacing of low-pressure inlets 132 of the low-pressure conduits 130a-b, as discussed above. Accordingly, the spools 160 have a length that spaces out the cross-blocks 150.

At the end of the assembly 100, the output spool 160d can connect with a flanged connection 164 to the high-pressure destination 230, which can be another manifold assembly, one or more systems at the wellhead 230, one or more systems in the wellbore of which the wellhead 230 is the surface termination, one or more systems downstream of the wellhead 230, or one or more other systems associated with the wellhead 230.

In several exemplary embodiments, each of the pumps 200a-h shown in FIGS. 4A-4B includes, or is part of, a positive displacement pump, a reciprocating pump assembly, a pump truck, a truck, a trailer, or any combination thereof.

Figure 5:
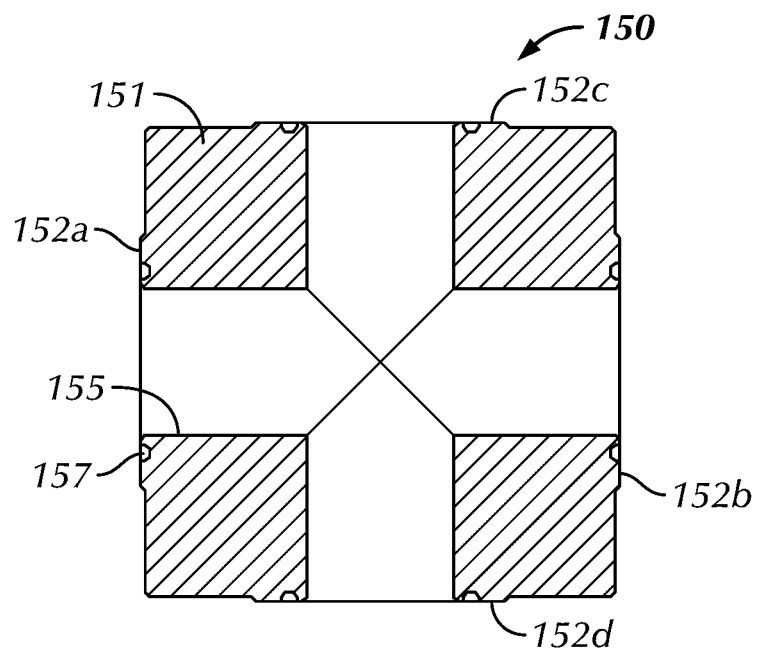
FIG. 5 is a cross-sectional view of a four-way cross-block for use in the disclosed assembly.

FIG. 5 is a cross-sectional view of a cross-block 150, which includes a body 151 having four port sides 152a-d. Fluid can flow through and communicate through ports 155 in the port sides 152a-b. Ring gaskets (not shown) can be fitted into ring gasket groove 157 in the port sides 152a-d to create a high-pressure, robust seal between other components that are fixedly attached via studded or flanged connections (not shown), as disclosed herein.

The ports 155 on the port sides 152c-152d are configured to communicate with the in-line flow of the spools (160) for delivery to the conduit's outlet (164). Therefore, the ports 155 for these port sides 152c-152d are preferably defined in line along an axis. By contrast, the ports 155 on the orthogonal port sides 152a-b are configured to receive discharge from the pumps. For manufacturing purposes, these ports 155 on the orthogonal port sides 152a-b can be aligned as shown. However, these ports 155 on the orthogonal port sides 152a-b can be offset from one another and can be angled differently to the orthogonal arrangement shown.

Figure 6:
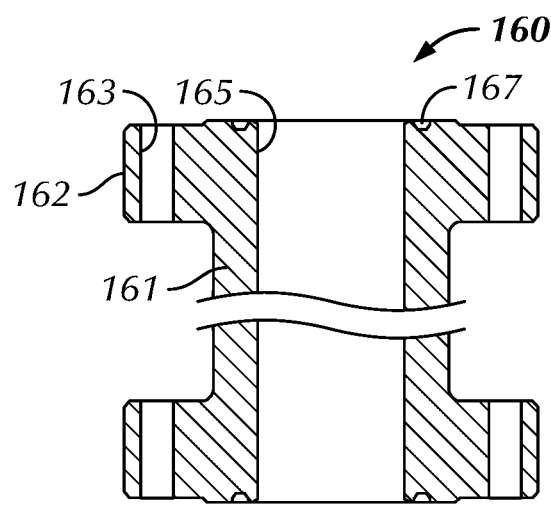
FIG. 6 is a cross-sectional view of a spool for use in the disclosed assembly.

FIG. 6 is a cross section view of a spool 160. The spool 160 is made up of a suitable alloy steel or composite which will typically meet API 6A standards. The spool 160 includes a conduit or tubing 161 with flanged ends 162. A central bore 165 allows for fluid to be pumped through the spool 160. Ring grooves 167 are suitably profiled on faces of the flanged ends 162 to receive a ring gasket (not shown) to create a high-pressure, robust seal with the matting components. Holes 166 in the flanged ends 162 receive studs (not shown) to bolt the spool 160 to the matting components and to compress the ring gaskets into the ring grooves 165.

The inner diameter of the bore 165 of the spool's tubing 161 can be configured for the pressures, types of flow, and other details related to a given implementation. Conventionally, the bore 165 can have a diameter ranging from about 5-in to about 9-in for use in conducing fracturing fluids and slurries of proppant.

Figure 7:
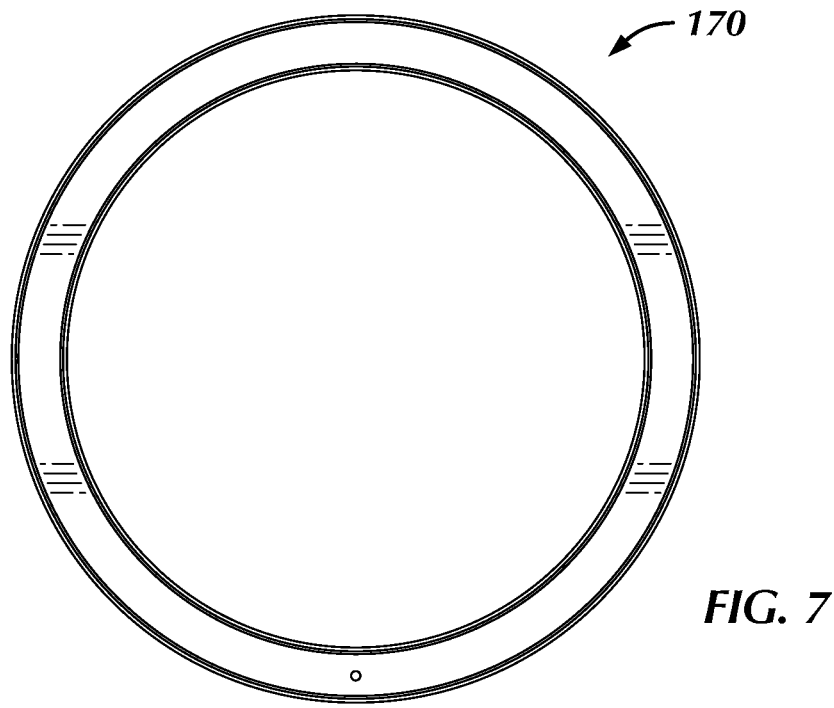
FIG. 7 is a top view of an embodiment of ring gasket for use in the disclosed assembly.

FIG. 7 is a top view of a ring gasket 170 for the disclosed manifold assembly. Preferably, the gasket 170 conforms to API 6A standards and is made of an alloy steel or suitable composite material.

Figure 8B:
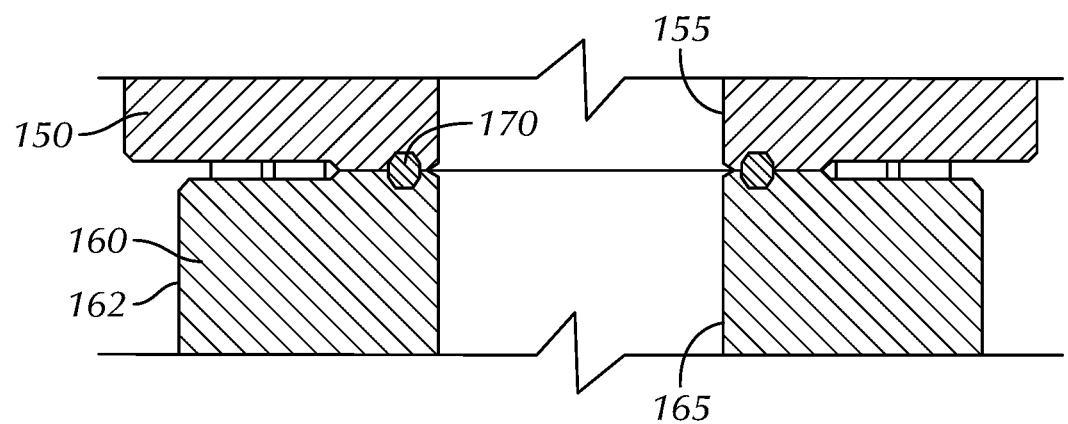
FIG. 8B is a cross-sectional view of a section of the high-pressure conduit.
Figure 8A:
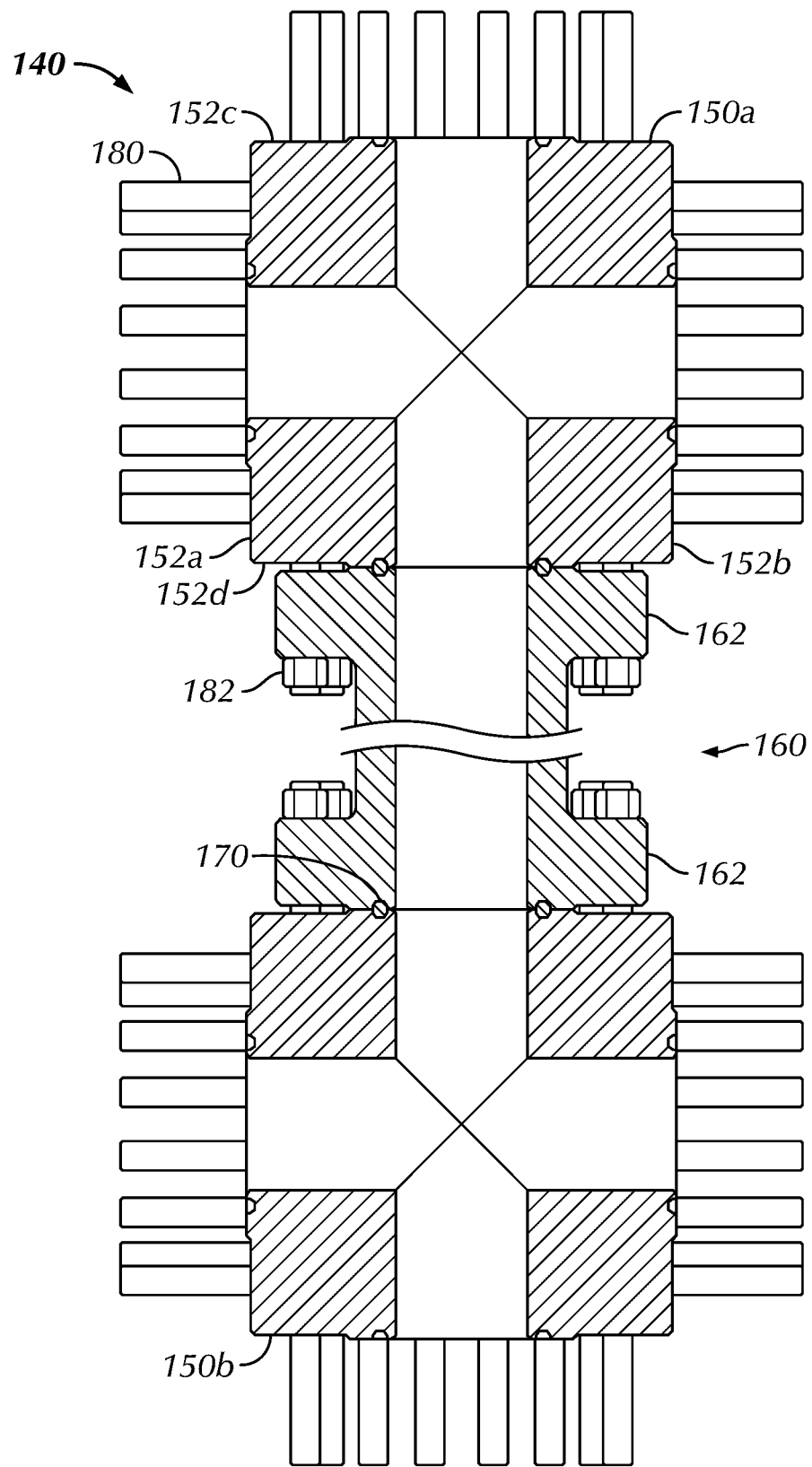
FIG. 8A is a cross-sectional view of a four-way cross-block, a spool, and a ring gasket mated together for the manifold assembly of the present disclosure.

FIG. 8A is a cross-sectional view of cross-blocks 150a-b bolted to flanged ends 162 of a spool 160 using studs 180 and bolts 182. Depending on the pressure and size of the spool 160 and the cross-blocks 150a-b, there can be up to eight to ten studs 180 used, for example. The studs 180 extend from each of the port sides 152a-d of the cross-blocks 150a-b. The studs 180 on the opposing port sides 152a-b can connect to bonnets for pump connections as noted herein. The studs 180 on the other opposing port sides 152c-d can be connected to the flanged ends 162 of spools or to a blind flange (not shown), as noted herein.

FIG. 8B is a cross-sectional view detailing the cross-block 150 fixedly attached to the flanged end 162 of the spool 160. Once the studs 180 and bolts 182 are torqued down, the ring gasket 170 is compressed into the profiles 157, 167 to create a high-pressure rated and very robust seal. Due to the high-pressure seal, the fluid port 155 on the cross-block 150 and the bore 165 of the spool 164 are connected to allow high pressure fluid communication or flow.

Figure 8C:
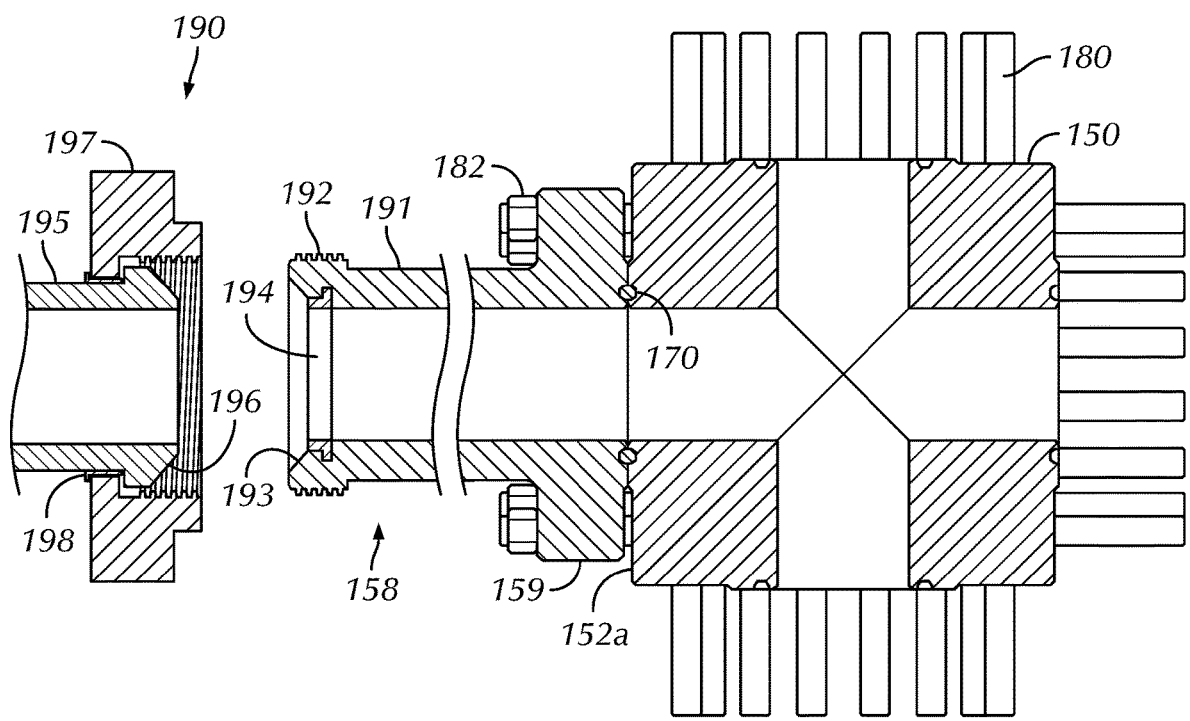
FIG. 8C is a cross-sectional view of a four-way cross-block, a bonnet, a hammer union, and a ring gasket mated together for the manifold assembly of the present disclosure.

FIG. 8C is a cross-sectional view of a four-way cross-block 150, a bonnet 159, and a ring gasket 170 mated together for the manifold assembly of the present disclosure. As noted previously, pressurized fluid enters the cross-block 150 via an inlet connection 158, such as the one shown here on a port side 152a. The inlet connection 158 can include a bonnet 159 attached to the cross-block 150a with studs 180, nuts 182, and the non-elastomeric sealing gasket 170, as disclosed herein. The bonnet 159 of the inlet 158 can include the female connector of a 1502 hammer wing union connection 190 for connecting with a male connector of the connection 190, which communicate with the discharge side of a pump (not shown).

The female connector includes a tubular protrusion 191 extending on the bonnet 159. The tubular protrusion has external thread 192 and a tapered face 193. The female connector may or may not have an inner secondary seal 194, such as a lip-type seal. Such a seal 194 can be composed of Nitrile Butadiene Rubber (NBR), Hydrogenated Nitrile Butadiene Rubber (HNBR), Fluoroelastomer (FKM), Polytetrafluoroethylene (PTFE), or the like and can include metal or composite backup rings. The male connector includes a tubular 195 having a nose 196 that fits into the tapered end 193 of the female connector. A hammer nut 197 disposed on the male's tubular 195 with a retainer segment 198 then threads to the external thread 192 on the female's tubular protrusion 191, which cinches up the nose 196 to the tapered end 193 with a metal-to-metal seal. The 1502 union connection 190 may be rated to up to 15,000 psi. Other types of connections could be used for the inlet 158.

As FIGS. 8A-8C show, the connections of the connection block 150 may not include any elastomeric seals. The gaskets 170 used between the spool 160 and connection block 150 and used between the inlet bonnet 159 and the connection block 150 can be metal or a composite material. The hammer union connection 190 may not include an elastomeric seal 194 on the female connector 191.

Figure 9A:
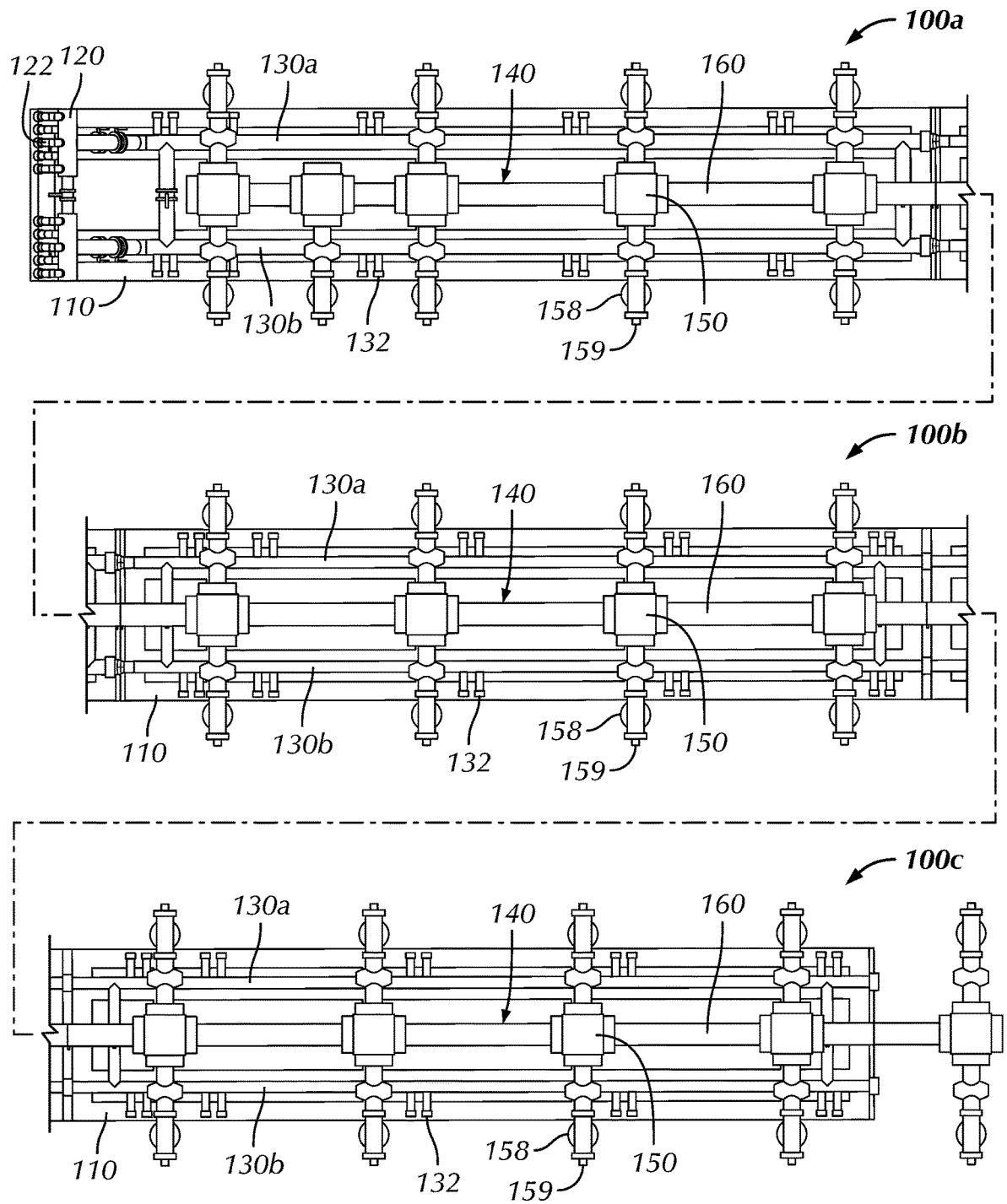
FIGS. 9A-9B are plan and side views of at least two manifold assemblies of the present disclosure configured together in series.
Figure 9B:
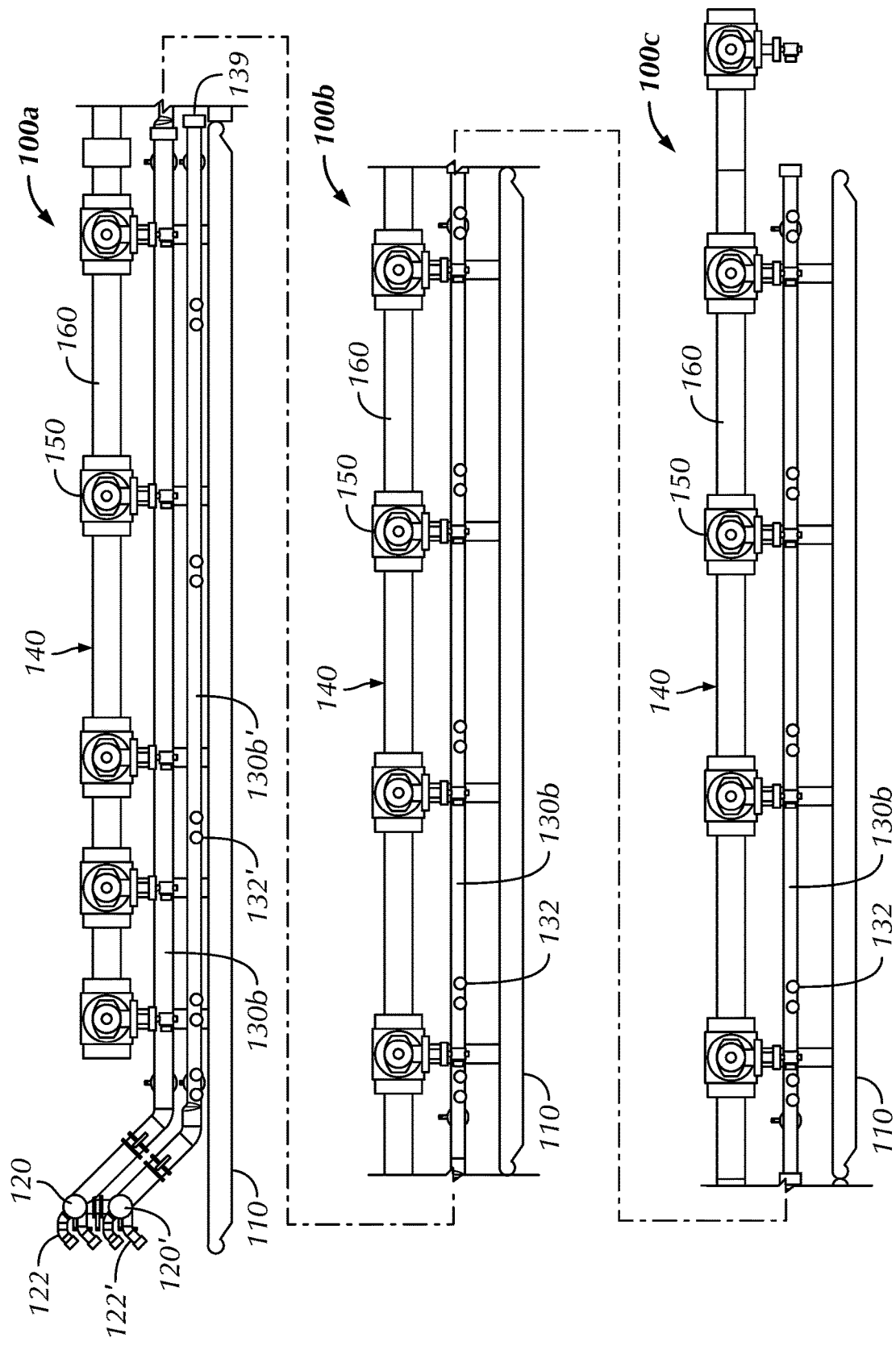

FIGS. 9A-9B illustrate plan and side views of two or more manifold assemblies 100a-c configured together in series. (Three assemblies 100a-c are shown here, but more of fewer can be used). The first assembly 100a is a blender skid that connects toward the blender or other low-pressure source (not shown). Accordingly, the blender skid 100a has the header 120 with the source connections 122. This blender skid 100a connects to the end of an intermediate assembly 100b, which in turn connections to a third assembly that connects toward the wellhead or other high-pressure destination (not shown).

Overall, each of the assemblies 100a-c are similar to those discussed previously and include a chassis 110 supporting at least one low-pressure conduit 130a-b and at least one high-pressure conduit 140. As before, the low-pressure conduit 130a-b has the outlet connections 132. As before, the high-pressure conduit 140 includes the cross-blocks 150 interconnected by the spools 160.

Each of the cross-blocks 150 include connections 158 for connecting to the discharge side of a pump (not shown), and these connections 158 can include valves 159. The assembly of assemblies 100a-c in FIGS. 9A-9C can accommodate the high-pressure and low-pressure connections for up to 26 pumps (not shown).

Figure 10A:
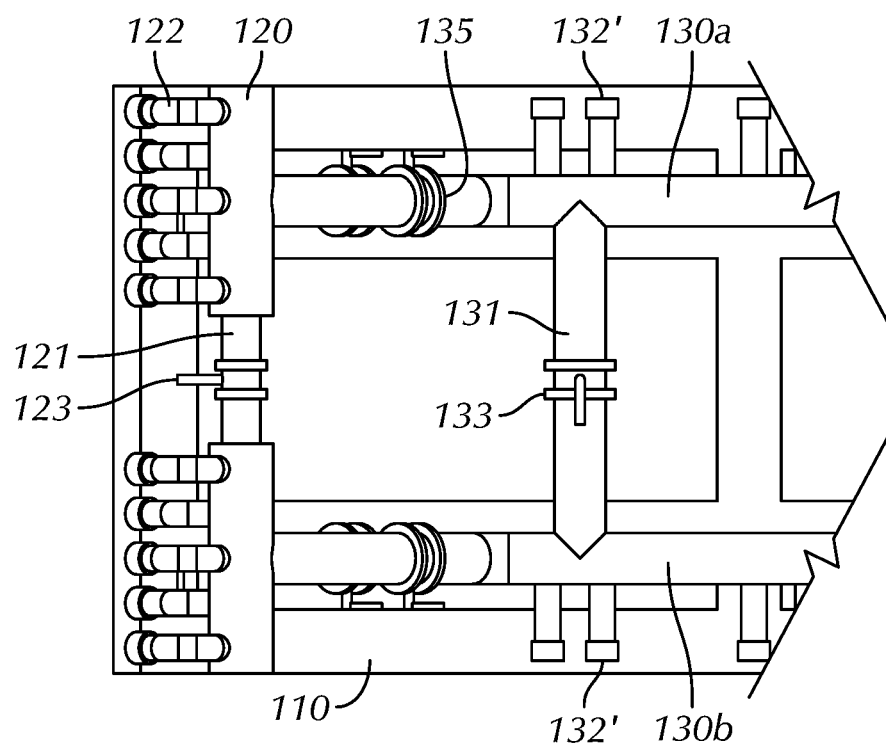
FIGS. 10A-10C are plan, end, and side views of a header arrangement for the disclosed manifold assembly.
Figure 10B:
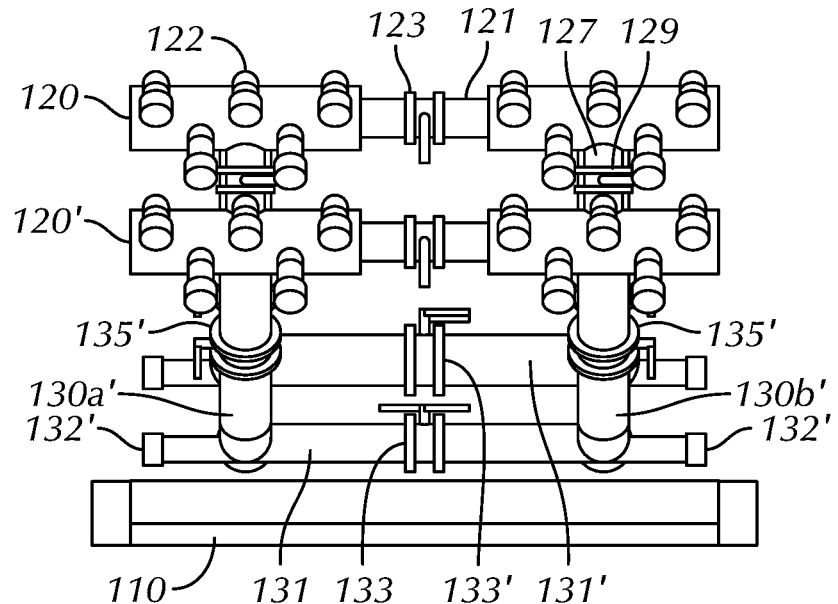
Figure 10C:
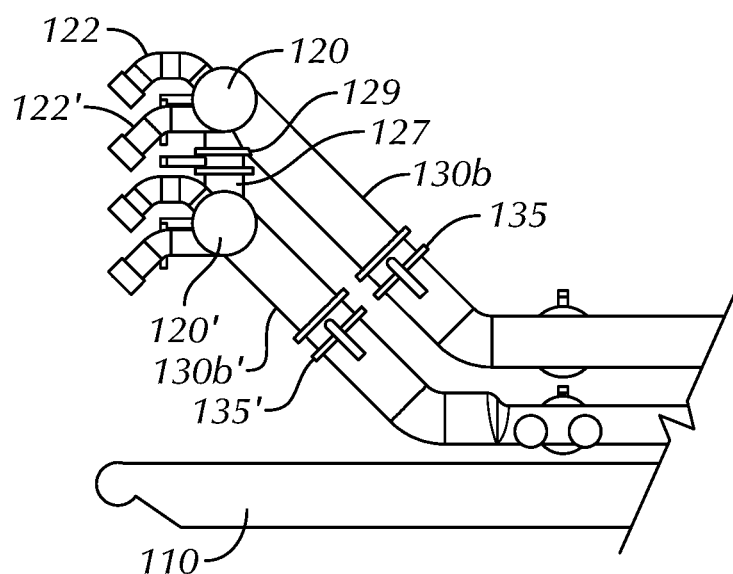

In contrast to the previous arrangements of the header 120, the blender skid 100a includes additional header components, piping, and valving. In particular, FIGS. 10A-10C illustrate plan, end, and side views of a header arrangement for the disclosed manifold assembly, such as the blender skid 100a from FIGS. 9A-9B.

The header arrangement has an upper header 120 with chambers separated by interconnecting piping 121 having a valve 123. The header arrangement also has a lower header 120' with chambers separated by interconnecting piping 121' having a valve 123'. The upper and lower headers 120, 120' are in turn interconnected to one another by piping 127 having valves 129.

The upper header 120 connects to a first set of the low-pressure conduits 130a-b, which each can have a valve 135 and can be interconnected with each other using an equalizer valve 133 on an equalizer line 131. Similarly, the lower header 120' connects to a second set of the low-pressure conduits 130'a-b, which each can have a valve 135' and can be in interconnected using an equalizer valve 133' on an equalizer line 131'.

Each of the sets of upper and lower conduits 130a-b, 130'a-b can have connections 132, 132' for a suction side of a pump. However, as best shown in the side view of the blender skid 100a in FIG. 9B, one of the sets (i.e., lower set 130') can have connections 132' while the other set 130 does not. As also shown in FIG. 9B, the one set (lower set 130') can end in a termination 139, while the other set (130) can connect to the adjoining conduits of the intermediate skid 100b.

The header arrangement in FIGS. 10A-10C allows for blocking off or combining the connections 132, 132' on the sides of the low-pressure conduit so the fluid can be conveyed downstream to the other assemblies 100b-c. As one example, the upper conduits 130a-b on the blender skid 100a may not include connections (132) so that these conduits 130a-b can instead convey the fluid downstream to the other skid assemblies 100b-c without suction by a pump as the blender skid 100A. Meanwhile, the connections 132' on the adjacent lower conduits 130'a-b can allow for isolated connection of suction sides of the pumps to the blender skid 100a. This can ensure that downstream pumps can have sufficient low-pressure fluid supply.

Additionally, the header arrangement allows for more than one type of fluid to be fed to the suctions sides of the pumps. At the header 120, for example, the two sides of the lower conduits 130'a-b can be fed the same or different fluids, the two sides of the upper conduits 130a-b can be fed the same or different fluids, and the upper and lower conduits 130a-b, 130'a-b can be fed the same or different fluids. In fact, the blender skid 100a can receive four different types of fluid from fluid sources for separate delivery to the suction sides of various pumps.

Figure 11:
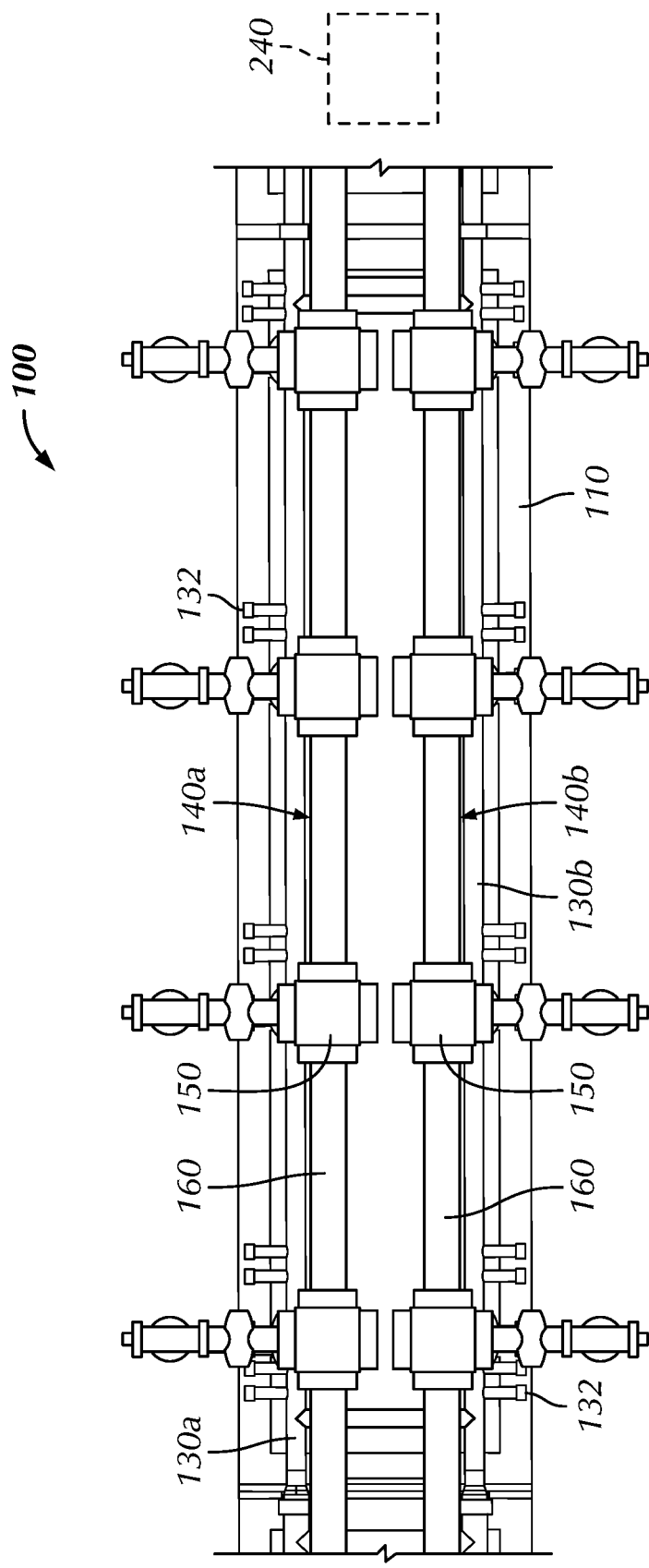
FIG. 11 is a plan view of another arrangement for the disclosed manifold assembly.

FIG. 11 is a plan view of another arrangement of a manifold assembly 100 according to the present disclosure. As noted previously, the manifold assemblies of the present disclosure can include at least one low-pressure conduit 130 and at least one high-pressure conduit 140. Previous arrangements included one high-pressure conduit. The arrangement in FIG. 11, however, includes two high-pressure conduits 140a-b running along the sides of the chassis 100. Both conduits 140a-c can be configured as before, having cross-blocks 150 and spools 160.

Ultimately, high-pressure flow from the separate conduits 140a-b can be sent to separate destination or can be combined into a common flow using a flow combiner 240 downstream of the assembly 100. As will be appreciated, such a flow combiner 240 can take many forms and can be configured so as to reduce pressure loss and avoid erosion from the high-pressure flow.

In an exemplary embodiment with continuing reference to FIGS. 2A to 11, the high-pressure conduit connections can have studded or flanged iron connections and open-faced connections that are manufactured to API 6A standards. One benefit of using studded or flanged iron connections and open-faced connections that are manufactured to API 6A standards is that there are no elastomer seals as the studded or flanged iron connections and open-faced connections utilize a suitable alloy steel ring gasket designed to handle very high pressure, while very reliable and robust to handle the harsh conditions and applications existing with fracking operations. Studded or flanged iron connections and open-faced connections that are manufactured to API 6A standards are preinstalled, serviced and inspected before arriving to a location. The manifold assembly can be preconfigured to a desired user's requirements which makes it easier and safer to connect directly to other components on location.

Fracture or Frac or Frack or Fracking can refer to pumping of fluids down into the earth, shattering or fracturing below the surface, pushing down or pumping fluid/sand or mixture thereof.

Connections can be integral or non-integral, wherein integral may mean for each stud there is a bolt secured to meet a specification; non-integral may mean the currently used connection has a wing nut, but it is understood to be such that the nut can easily be removed and hence the connection is easily removed.

Free-standing skid may refer to a skid that is loaded onto a trailer and moved to a specific site and then set on the ground. Mounted or configured to a trailer may refer an element being mounted or secured onto the trailer and having its own set of wheels for easy transport of the skid. Cross-blocks, also referred to as blocks or connection blocks, may refer to a connecting point secured to a spool, and can be configured with two, four, or more ways or connection points.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A manifold assembly connectable to fracturing pumps that pressurize fluid from a low-pressure source for delivery to a high-pressure destination, the assembly comprising:
   a first chassis having a length;
   a pair of first conduits supported on the first chassis and disposed along the length, each of the first conduits of the pair having a first inlet and having a first outlet, each of the first inlets being configured to receive the fluid at low-pressure, each of the first outlets being configured to deliver the fluid at low-pressure;

a first valve interconnected at a point between the pair of the first conduits, the first valve being configured to open and close fluid communication between the pair of the first conduits;

a first header having at least one first header inlet configured to receive the fluid at low-pressure, the first header having a first chamber in fluid communication with the first inlet of one of the first conduits, the first header having a second chamber in fluid communication with the first inlet of the other of the first conduits;

a first header valve interconnecting the first and second chambers of the first header together and being configured to open and close fluid communication between the first and second chambers; and a second conduit supported on the first chassis and disposed along the length, the second conduit having at least two second inlets and having a second outlet, each of the at least two second inlets being configured to receive the fluid at high-pressure from one of the fracturing pumps, the second outlet of the second conduit being configured to deliver the fluid at high pressure to the high-pressure destination.

2. The assembly of claim 1, further comprising second valves each disposed on a corresponding one of the first conduits between the corresponding first inlet and the point interconnected by the first valve, each of the second valves being configured to open and close fluid communication in the corresponding first conduit.

3. The assembly of claim 1, wherein the first valve is disposed on a line interconnected between the pair of the first conduits.

4. The assembly of claim 1, further comprising a second header having at least one second header inlet configured to receive the fluid at low-pressure, wherein the assembly further comprises another pair of first conduits each connected in fluid communication with the second header.

5. The assembly of claim 4, wherein the second header comprises:
third and fourth chambers, the third chamber connected in fluid communication with one of the first conduits of the other pair, the fourth chamber connected in fluid communication with another of the first conduits of the other pair; and
a second header valve interconnecting the third and fourth chambers of the second header together.

6. The assembly of claim 5, further comprising:
a third header valve interconnecting the first chamber of the first header and the third chamber of the second header together; and
a fourth header valve interconnecting the second chamber of the first header and the fourth chamber of the second header together.

7. The assembly of claim 4, further comprising a second valve interconnecting the other pair of the of the first conduits together, the second valve being configured to open and close fluid communication between the other pair of the first conduits.

8. The assembly of claim 1, wherein the second conduit comprises at least one connection block and at least one spool connected in fluid communication with one another, the at least one connection block having the at least two second inlets, the at least one connection block having at least one port side, the at least one spool connected to the at least one port side and being configured to deliver the fluid at high pressure to the second outlet of the second conduit.

9. The assembly of claim 8, wherein the at least one connection block comprises the at least two second inlets on first opposing sides thereof, the at least two second inlets communicating with one another inside the at least one connection block; and wherein the at least one connection block comprises two of the at least one port side on second opposing sides thereof, the two of the at least one port sides communicating with one another and with the two second inlets inside the at least one connection block.

10. The assembly of claim 8, wherein each of the second inlets on the at least one connection block comprises a bonnet connected with a plurality of studs and bolts to the at least one connection block; and a ring gasket sealing the bonnet to the at least one connection block, the bonnet having a female member of a hammer union for coupling with a male member of the hammer union from the corresponding one of the pumps.

11. The assembly of claim 8, wherein the at least one spool comprises a flanged end connected with a plurality of studs and bolts to the at least one port side of the at least one connection block.

12. The assembly of claim 11, wherein the flanged end defines a circumferential groove in a face thereof; wherein the at least one connection block defines a corresponding circumferential groove in a face thereof circumscribing the at least one port side; and wherein a gasket is sandwiched between the circumferential grooves.

13. The assembly of claim 1, wherein each of the first outlets comprises a second valve configured to open and close fluid communication therethrough.

14. The assembly of claim 1, wherein each of the first conduits of the pair comprises at least one outlet port configured to connect in fluid communication with another conduit.

15. The assembly of claim 1, wherein the second conduit comprises a pair of the second conduit supported on the first chassis and disposed along the length adjacent one another.

16. The assembly of claim 15, wherein each of the second conduits of the pair comprises at least one connection block and at least one spool, the at least one connection block having one of the at least two second inlets and having at least one port side, the at least one spool connected to the at least one port side of the at least one connection block and being configured to deliver the fluid at high pressure to the high-pressure destination.

17. The assembly of claim 16, wherein the second outlets of the second conduits of the pair combine to a common outlet.

18. The assembly of claim 1, further comprising
a second chassis supporting additional ones of the first conduits and an additional one of the second conduit,
the additional ones of the first conduits disposed in line with, and connected in fluid communication with, the first conduits of the first chassis,
the additional one of the second conduit disposed in line with, and connected in fluid communication with, the second conduit of the first chassis.

19. A method of pressurizing fluid from a low-pressure source with one or more fracturing pumps for delivery to a high-pressure destination, the method comprising:
receiving the fluid at low pressure from the low-pressure source;
controlling communication of the fluid to a pair of first conduits supported on a chassis by controlling communication of the fluid between the pair of the first conduits using a first header valve disposed between a pair of first header chambers, each first header chamber being connected to one of the first conduits;

controlling communication of the fluid from at least one of a plurality of first outlets spaced along a first length of the first conduits, each of the first outlets being supported together on the same chassis and being configured to deliver the fluid at low-pressure to a corresponding one of the one or more fracturing pumps;

receiving the fluid at high pressure from at least one of the one or more fracturing pumps at at least one of a plurality of second inlets of a second conduit supported on the chassis, each of the second inlets being supported together on the same chassis and being configured to receive the fluid at high-pressure;

conveying the fluid along a second length of the second conduit to a second outlet configured to deliver the fluid at high-pressure to the high-pressure destination; and controlling communication of the fluid to a pair of third conduits supported on the chassis by controlling communication of the fluid between the pair of the third conduits using a second header valve disposed between a pair of second header chambers, each second header chamber being connected to one of the third conduits.

20. The method of claim 19, further comprising controlling communication of the fluid between the pair of first header chambers with the pair of second header chambers using third and fourth header valves, each of the third and fourth header valves being interconnected between one of the pair of the first header chambers and one of the pair of the second header chambers.

21. The method of claim 19, wherein controlling the communication of the fluid between the pair of the first conduits further comprises using a valve interconnected at a point between the pair of the first conduits, the valve being configured to open and close fluid communication between the pair of the first conduits.

22. The method of claim 19, comprising at least one of:
controlling communication of the fluid through the first conduits using first valves disposed on the first conduits, each of the first valves being configured to open and close fluid communication in the corresponding first conduit;
controlling communication of the fluid from the first outlets using second valves disposed at the first outlets and configured to open and close fluid communication therethrough;
conveying the fluid in the first conduits to outlet ports configured to connect in fluid communication with other conduits; and
receiving and conveying the fluid at high pressure using a pair of the second conduit supported on the chassis and disposed adjacent one another.

23. A manifold assembly connectable to fracturing pumps that pressurize fluid from a low-pressure source for delivery to a high-pressure destination, the assembly comprising:
a first chassis having a length;
first conduits supported on the first chassis and disposed along the length, each of the first conduits having a first inlet and having a first outlet, each of the first inlets being configured to receive the fluid at low-pressure, each of the first outlets being configured to deliver the fluid at low-pressure;

a first header having at least one first header inlet configured to receive the fluid at low-pressure, the first header having a first chamber in fluid communication with the first inlet of a first of the first conduits, the first header having a second chamber in fluid communication with the first inlet of a second of the first conduits;

a first header valve interconnected between the first and second chambers and being configured to open and close fluid communication between the first and second chambers;

a second header having at least one second header inlet configured to receive the fluid at low-pressure, the second header having third and fourth chambers, the third chamber connected in fluid communication with a third of the first conduits, the fourth chamber connected in fluid communication with a fourth of the first conduits;

a second header valve interconnecting the third and fourth chambers of the second header together; and a second conduit supported on the first chassis and disposed along the length, the second conduit having at least two second inlets and having a second outlet, each of the at least two second inlets being configured to receive the fluid at high-pressure from one of the fracturing pumps, the second outlet of the second conduit being configured to deliver the fluid at high pressure to the high-pressure destination.

24. The assembly of claim 23, further comprising:
a third header valve interconnecting the first chamber of the first header and the third chamber of the second header together; and
a fourth header valve interconnecting the second chamber of the first header and the fourth chamber of the second header together.

25. The assembly of claim 23, wherein the second conduit comprises at least one connection block and at least one spool connected in fluid communication with one another, the at least one connection block having the at least two second inlets, the at least one connection block having at least one port side, the at least one spool connected to the at least one port side and being configured to deliver the fluid at high pressure to the second outlet of the second conduit.

26. The assembly of claim 23, wherein at least one of:
first valves are each disposed on a corresponding one of the first conduits between the corresponding first inlet and the respective chamber, each of the first valves being configured to open and close fluid communication in the corresponding first conduit;
each of the first outlets comprises a second valve configured to open and close fluid communication therethrough;
each of the first conduits comprises at least one outlet port configured to connect in fluid communication with another conduit; and
the second conduit comprises a pair of the second conduit supported on the first chassis and disposed along the length adjacent one another.

27. The assembly of claim 23, further comprising a valve interconnected at a point between a pair of the first conduits, the valve being configured to open and close fluid communication between the pair of the first conduits.

* * * * *